No. 748,287. PATENTED DEC. 29, 1903.
H. KIRCHHOFF.
LINEN BUTTON.
APPLICATION FILED MAY 2, 1903.
NO MODEL.
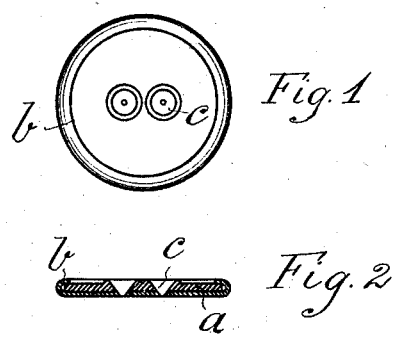
Witnesses
Inventor No. 748,287. Patented December 29, 1903.

UNITED STATES PATENT OFFICE.

HERMANN KIRCHHOFF, OF BARMEN, GERMANY, ASSIGNOR TO THE FIRM OF MANN & STUMPE, OF BARMEN, GERMANY.

LINEN BUTTON.

SPECIFICATION forming part of Letters Patent No. 748,287, dated December 29, 1903.

Application filed May 2, 1903. Serial No. 155,433. (No model.)

*To all whom it may concern:*

Be it known that I, HERMANN KIRCHHOFF, a subject of the Emperor of Austria-Hungary, residing in the city of Barmen, Rhenish Prussia, Empire of Germany, have invented a new and useful Improvement in Linen Buttons, of which the following is a specification.

My invention has for its object a linen button which has the property of being hard when it is dry and flexible when in a wet state, so that the button is infrangible.

Figure 1 is a top view of the button. Fig. 2 is a section thereof.

The new button consists of a core $a$, a textile or fibrous material or a weaving, felt, or the like which is impregnated with animal albumen. By coagulating the albumen, material will be attained that the button in a dry state is perfectly hard, but in wet state or when moistened has a high elasticity, so that it may be washed, boiled, wringed, calendered for cleaning and other purposes without breaking or being altered in its shape. When dried, the button assumes again its hard state and its original appearance.

This button may be fitted with a lining $b$, of the material described, which is also impregnated with albumen and treated by coagulation. By the said albumen the said lining is united with the button, both forming then the fabric, they being pressed together in the desired shape.

The coagulation of the animal albumen is either done by hot pressure or after a special treatment in a known manner.

The button may be made in any desired form, size, and color and provided with holes $c$ for attachment.

Having fully described my invention, what I claim, and wish to secure by Letters Patent, is—

1. A linen button consisting of a fibrous or textile material impregnated with animal albumen for the purpose described and set forth.

2. A button consisting of a fibrous or textile material impregnated with animal albumen said button having a lining of any textile material impregnated with animal albumen and united with the body of the button for the purpose described and set forth.

HERMANN KIRCHHOFF.

Witnesses:
 OTTO KÖNIG,
 J. A. RITTERSHAUS.